(12) United States Patent
Ohtsu

(10) Patent No.: US 6,246,946 B1
(45) Date of Patent: Jun. 12, 2001

(54) AUTOMOTIVE BRAKE CONTROL SYSTEM WITH SKID CONTROL UNIT

(75) Inventor: Nobuyuki Ohtsu, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/461,364

(22) Filed: Dec. 15, 1999

(30) Foreign Application Priority Data

Dec. 16, 1998 (JP) ................................................ 10-357713

(51) Int. Cl.$^7$ .............................. G06F 7/00; G06F 17/00
(52) U.S. Cl. ................................. 701/71; 701/74; 701/70; 303/138; 303/171; 280/757
(58) Field of Search .................... 701/71, 74, 79, 701/91, 70; 303/138, 171; 188/2 R, 382; 280/757

(56) References Cited

U.S. PATENT DOCUMENTS

| | | | |
|---|---|---|---|
| 5,286,097 | * 2/1994 | Myoi et al. | 303/150 |
| 5,413,405 | * 5/1995 | Okazaki | 303/150 |
| 5,498,072 | * 3/1996 | Shimizu | 303/191 |
| 5,992,951 | * 11/1999 | Naito et al. | 303/171 |
| 6,026,343 | * 2/2000 | Ogino | 701/72 |

FOREIGN PATENT DOCUMENTS 7-89428    4/1995 (JP) .

* cited by examiner

*Primary Examiner*—William A. Cuchlinski, Jr.
*Assistant Examiner*—Olga Hernandez
(74) *Attorney, Agent, or Firm*—Foley & Lardner

(57) ABSTRACT

An automotive brake control system with an ABS system employing a hydraulic modulator, wheel-speed sensors, and a skid control unit. A vehicle deceleration $\Delta Vi$ is calculated on the basis of a first speed V0 corresponding to the pseudo vehicle speed calculated at a time when the vehicle starts to decelerate and a second speed Vp corresponding to the pseudo vehicle speed calculated at a time when the pseudo vehicle speed is changed from an increasing state to a decreasing state at each cycle of the skid control, from a predetermined expression $\Delta Vi=(V0-Vp)/T$, where T denotes a derivative time. A pseudo-vehicle-speed arithmetic-calculation section is provided for selecting a select-HIGH wheel speed as a reference value during running in a non-resonant speed range or during skid control, and for selecting a wheel speed except the select-HIGH wheel speed as the reference value during running in a resonant speed range, and for arithmetically calculating the pseudo vehicle speed Vi on the basis of the reference value and the vehicle deceleration $\Delta Vi$. A compensation section is also provided for compensating for the vehicle deceleration $\Delta Vi$, that is, the pseudo vehicle speed Vi by way of addition ($\Delta Vi=\{(V0+\Delta VHR0)-Vp\}/T$) of a correction value $\Delta VHR0$ to the first speed V0 during running in the resonant speed range.

9 Claims, 9 Drawing Sheets

FIG.8A
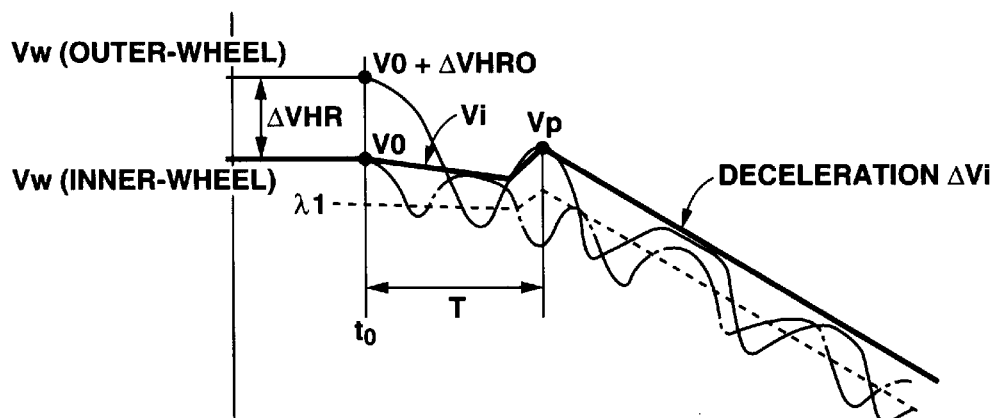
FIG.8B
W/C (OUTER-WHEEL)
W/C (INNER-WHEEL)
FIG.8C
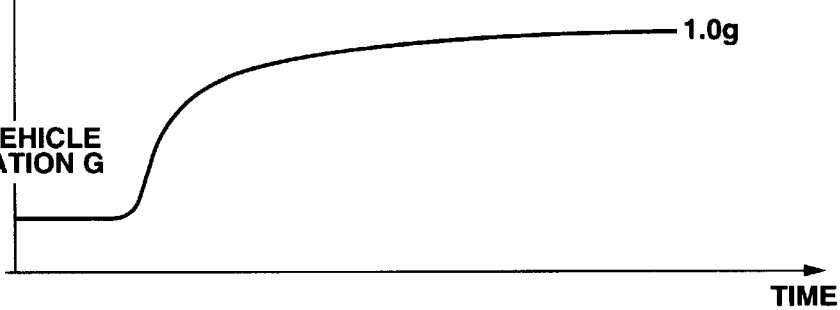
ACTUAL VEHICLE
DECELERATION G
FIG.8D
TIME

AUTOMOTIVE BRAKE CONTROL SYSTEM WITH SKID CONTROL UNIT

BACKGROUND OF THE INVENTION

1. Field of the Invention

The present invention relates to a brake control system for automotive vehicles, and specifically to a computer-controlled braking system with a skid control unit (an ABS unit) acting to prevent a wheel lock-up condition during vehicle deceleration and to provide maximum effective braking by virtue of a computer-controlled, regulated wheel-brake cylinder pressure based on an arithmetically-calculated deceleration of the vehicle body instead of an input informational data signal from a longitudinal acceleration sensor.

2. Description of the Prior Art

As is well known, in typical skid control systems (ABS systems), rotational wheel speed sensors are employed at each road wheel to sense a rotational wheel speed Vw of each road wheel. In order for the ABS system to arithmetically calculate vehicle speed and then calculate a slippage at each road wheel on the basis of the arithmetically-calculated vehicle speed Vi (often called "pseudo vehicle speed") and wheel speed data of each road wheel, a highest one of the wheel speeds sensed at the respective wheels is often used as a selected value (a reference value) Vfs. The selected value Vfs, corresponding to the highest wheel speed of the wheel speed data signals will be herebelow referred to as a "select-HIGH wheel speed". During skid control, the wheel speed Vw of a certain road wheel (especially subjected to the skid control) tends to vary widely apart from the actual vehicle speed. Also, in order to estimate changes in the pseudo vehicle speed Vi or to compensate for the difference between the actual vehicle speed and the pseudo vehicle speed Vi, an arithmetically-calculated deceleration ΔVi of the vehicle is often used instead of the use of a signal from a longitudinal acceleration sensor. As a method of arithmetically calculating the vehicle deceleration ΔVi, the conventional ABS system uses two values or two points, one being a value V0 of the pseudo vehicle speed Vi calculated at the time when the vehicle deceleration is started, and the other being a value Vp of the pseudo vehicle speed Vi calculated at the time when the pseudo vehicle speed Vi changes from an increasing state to a decreasing state at each cycle of skid control. The former value V0 will be hereinafter referred to as a "vehicle-deceleration starting-period vehicle speed", whereas the latter value Vp will be hereinafter referred to as a "spin-up speed" or a "spin-up speed value" or a "return-to-normal speed value". Actually, the vehicle deceleration ΔVi is calculated as a gradient of the line segment including the above-mentioned two points V0 and Vp, from an expression ΔVi=(V0−Vp)/T, where T denotes a derivative time (a time interval between the two points V0 and Vp). During execution cycle of the skid control, the arithmetically-calculated vehicle deceleration can be used, rather than using a sensor signal value from a longitudinal acceleration sensor, and thus the system operates in conjunction with a signal indicative of a slippage which is calculated based on both the wheel speed of each road wheel and the pseudo vehicle speed corrected by the arithmetically-calculated vehicle deceleration ΔVi. In comparison with the use of an expensive longitudinal acceleration sensor, the use of arithmetically-calculated vehicle deceleration ΔVi is advantageous in reduced production costs of the ABS system. In arithmetically calculating the pseudo vehicle speed Vi based on the select-HIGH wheel speed, there is another drawback. That is, during braking action, there is a tendency for brake resonance noise (rumbling noise) to occur especially at front road wheels. In such a case, a signal indicative of the wheel speed Vw, contains electrical noise. As a result, the select-HIGH wheel speed is set undesirably at an extremely high level, and thus the accuracy of arithmetic-calculations of the pseudo vehicle speed Vi and the vehicle deceleration ΔVi may be deteriorated. To avoid this, Japanese Patent Provisional Publication No. 7-89428 teaches selection of the previously-noted selected value (the reference value) Vfs from the highest wheel speed in the four wheel speeds sensed each road wheel and the lowest wheel speed (or the second lowest wheel speed data), depending on whether the vehicle speed is within a resonant speed range that there is an increased tendency of occurrence of resonance between sprung and unsprung masses in a vehicle suspension vibrating system and/or in a brake vibrating system. In the system disclosed in the Japanese Patent Provisional Publication No. 7-89428, when the vehicle is running in a non-resonant speed range (i.e., a high-speed range) except the resonant speed range or a skid control system is in operation, the select-HIGH wheel speed is selected as the selected value Vfs by way of a so-called select-HIGH process. In contrast, when the vehicle is running in the resonant speed range (i.e., a low-speed range) and the ABS is in its in-operative state, the lowest wheel speed or the second lowest wheel speed data is selected as the selected value Vfs by way of a so-called select-LOW process. The lowest wheel speed or the second lowest wheel speed will be hereinafter referred to as a "select-LOW wheel speed".

SUMMARY OF THE INVENTION

However, in case of the use of the selected value Vfs switched between the select-HIGH wheel speed and the select-LOW wheel speed depending on whether the vehicle is running in the non-resonant speed range or in the resonant speed range, there is another problem owing to the difference between a turning radius of the outer wheel and a turning radius of the inner wheel, during turns.

As appreciated from the timing charts shown in FIGS. 9A–9C, when the vehicle turns to the right or to the left, there is the wheel-speed difference between outer and inner road wheels, arising from the turning-radius difference between the outer-wheel turning radius and the inner-wheel turning radius. Assuming that the brakes are applied and then the ABS system comes into operation during the vehicle turn at low speeds, a select-HIGH wheel speed (an outer-wheel speed) will be selected as a selected value Vfs through the select-HIGH process. Before the skid control initiates, a select-LOW wheel speed (an inner-wheel speed) will be selected as a selected value Vfs through the select-LOW process. In extracting the previously-discussed two values V0 and Vp necessary to arithmetically calculate the vehicle deceleration ΔVi during the vehicle turn, the vehicle-deceleration starting-period vehicle speed V0 is produced as a pseudo vehicle speed based on the select-LOW wheel speed (the inner-wheel speed) at the beginning of braking action with the vehicle rounding a turn, while the spin-up speed Vp, which may occur during the skid control, is produced as a pseudo vehicle speed based on the select-HIGH wheel speed (the outer-wheel speed) during the skid control. Therefore, there is a tendency that the value of the difference (V0−Vp) between the two values V0 and Vp determined by the two different selecting processes is erroneously derived or computed as a value less than the actual time rate of change of vehicle speed (that is, the actual vehicle deceleration). In the worst case (V0<Vp), as shown in FIG. 9A, the vehicle-deceleration starting-period vehicle speed V0 becomes less than the spin-up speed Vp, and thus there is a possibility that a vehicle-accelerating period is recognized by the system, even during the decelerating period. In the example shown in FIG. 9A, used is a data processing method that a greater one of a predetermined deceleration value VIK such as 0.1 g and the arithmetically-calculated deceleration (V0−Vp)/T based on the two values V0 and Vp, is selected as the vehicle deceleration. As a result of such a data-processing method, the vehicle deceleration ΔVi is set at 0.1 g (that is, ΔVi=0.1 g). As discussed above, if the vehicle deceleration ΔVi is estimated or processed or calculated as a lower value than the actual vehicle deceleration, the corrected pseudo vehicle speed, usually calculated as the sum of the pseudo vehicle speed Vi and a negative value—|∫(ΔVi)| of an absolute value |∫(ΔVi)| of an integrated value |∫(ΔVi) of the vehicle deceleration ΔVi, is calculated or estimated as an overestimated speed value. Thus, a pressure-reduction threshold value λ1 based on the corrected pseudo vehicle speed tends to become an overestimated threshold value. This may result in an undesirable pressure-reduction timing. The system may erroneously determine that the vehicle is driving on a road surface on a low frictional coefficient (or a low-μroad), even during the vehicle driving on a high-μroad, thus there is a possibility of excessive pressure reduction (that is, a lack of braking force). Also, there is a possibility that the overestimated pressure-reduction threshold value gives the driver a poor brake feel, as if there is no stroke of the brake pedal in spite of the driver's brake-pedal depression (in comparison with a degree of reaction force or push-back force pushed back through the brake pedal and transmitted to the foot of the driver).

Accordingly, it is an object of the invention to provide an automotive brake control system with an anti-skid control unit which avoids the aforementioned disadvantages of the prior art.

It is another object of the invention to provide an automotive brake control system with an anti-skid control unit, which is capable of accurately estimating or calculating a vehicle deceleration value ΔVi without using an expensive longitudinal acceleration sensor, and of avoiding the problem of overestimation of a pseudo vehicle speed during turns, while preventing system malfunction caused by brake resonance noise contained in a wheel-speed indicative signal and arising from resonance between sprung and unsprung masses in a vehicle suspension system or in a brake vibrating system.

In order to accomplish the aforementioned and other objects of the present invention, an automotive brake control system, comprises a hydraulic modulator capable of regulating wheel-brake cylinder pressures of each of road wheels of an automotive vehicle, independently of each other, wheel-speed sensors detecting wheel speeds of each of the road wheels, and a skid control unit configured to be electronically connected to the hydraulic modulator, for operating said hydraulic modulator in response to input information signals from the wheel-speed sensors to prevent a wheel lock-up condition of each of the road wheels, the skid control unit comprising a comparator determining whether the vehicle is running in a resonant speed range in which there is an increased tendency of occurrence of resonance between sprung and unsprung masses in at least one of a vehicle suspension vibrating system and a brake vibrating system, or in a non-resonant speed range except the resonant speed range, a vehicle deceleration arithmetic-calculation section arithmetically calculating a vehicle deceleration ΔVi on the basis of a first speed V0 corresponding to the pseudo vehicle speed calculated at a time when the vehicle starts to decelerate and a second speed Vp corresponding to the pseudo vehicle speed calculated at a time when the pseudo vehicle speed is changed from an increasing state to a decreasing state at each cycle of skid control, from a predetermined expression ΔVi=(V0−Vp)/T, where V0 denotes the first speed, Vp denotes the second speed, and T denotes a derivative time corresponding to a period of time from the time when the vehicle starts to decelerate to the time when the pseudo vehicle speed is changed from the increasing state to the decreasing state, a pseudo-vehicle-speed arithmetic-calculation section selecting a highest wheel speed of the wheel speeds as a reference value when the vehicle is running in the non-resonant speed range or during skid control, and selecting a wheel speed except the highest wheel speed from the wheel speeds as the reference value when the vehicle is running in the resonant speed range, and arithmetically calculating the pseudo vehicle speed on the basis of the reference value and the vehicle deceleration ΔVi during deceleration of the vehicle, and a compensation section compensating for the pseudo vehicle speed by adding a correction value ΔVHR0 to the first speed V0 when the vehicle is running in the resonant speed range. It is preferable that the correction value ΔVHR0 is set at a wheel-speed difference between left and right road wheels, detected by the wheel-speed sensors, when the vehicle starts to decelerate. More preferably, the wheel-speed difference between the left and right road wheels corresponds to a wheel-speed difference between non-driven road wheels. Alternatively, the correction value ΔVHR0 may be fixed to a maximum wheel-travel difference of the vehicle equipping the automotive brake control system. The pseudo-vehicle-speed arithmetic-calculation section may include a comparator which compares the pseudo vehicle speed to the reference value and generates a comparator signal indicating that the vehicle is decelerating when the pseudo vehicle speed is less than the reference value. In presence of the comparator signal indicating that the vehicle is decelerating, the pseudo-vehicle-speed arithmetic-calculation section arithmetically calculates the pseudo vehicle speed from an expression $Vi_{(n)}=Vi_{(n-1)}-\Delta Vi \times T_{10}$, where $Vi_{(n)}$ denotes a current value of the pseudo vehicle speed, $Vi_{(n-1)}$ denotes a previous value of the pseudo vehicle speed calculated one cycle before, ΔVi denotes the vehicle deceleration, and $T_{10}$ denotes a predetermined time interval between two consecutive cycles of arithmetic calculation of the pseudo vehicle speed Vi. It is preferable to compensate for the pseudo vehicle speed, so that the vehicle deceleration arithmetic-calculation section arithmetically calculates the vehicle deceleration ΔVi by the predetermined expression ΔVi=(V0−Vp)/T when the vehicle is running in the non-resonant speed range, and by a predetermined expression ΔVi={(V0+ΔVHR0)−Vp}/T when the vehicle is running in the resonant speed range.

BRIEF DESCRIPTION OF THE DRAWINGS

FIGS. 8A to 8D are timing charts illustrating simulation results pertaining to variations in the pseudo vehicle speed Vi, variations in the outer wheel speed $Vw_{(OUTER-WHEEL)}$, variations in the inner wheel speed $Vw_{(INNER-WHEEL)}$, variations in the outer-wheel side wheel-brake cylinder pressure $W/C_{(OUTER-WHEEL)}$, the inner-wheel side wheel-brake cylinder pressure $W/C_{(INNER-WHEEL)}$, and the actual vehicle deceleration, with compensation for the pseudo vehicle speed Vi in the resonant speed range.

DESCRIPTION OF THE PREFERRED EMBODIMENTS

Figure 1:
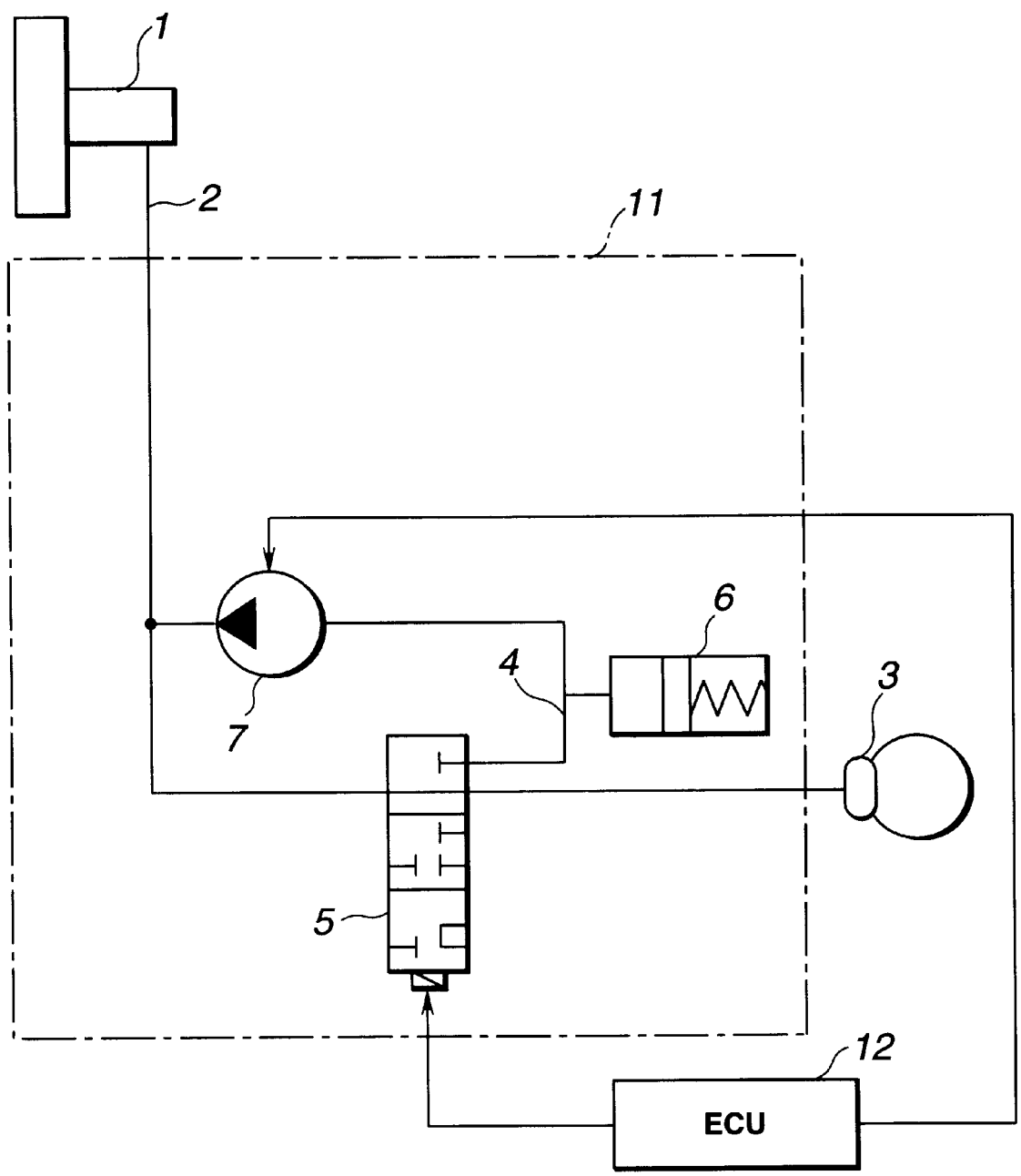
FIG. 1 is an automotive brake control system block diagram of an embodiment.
Figure 2:
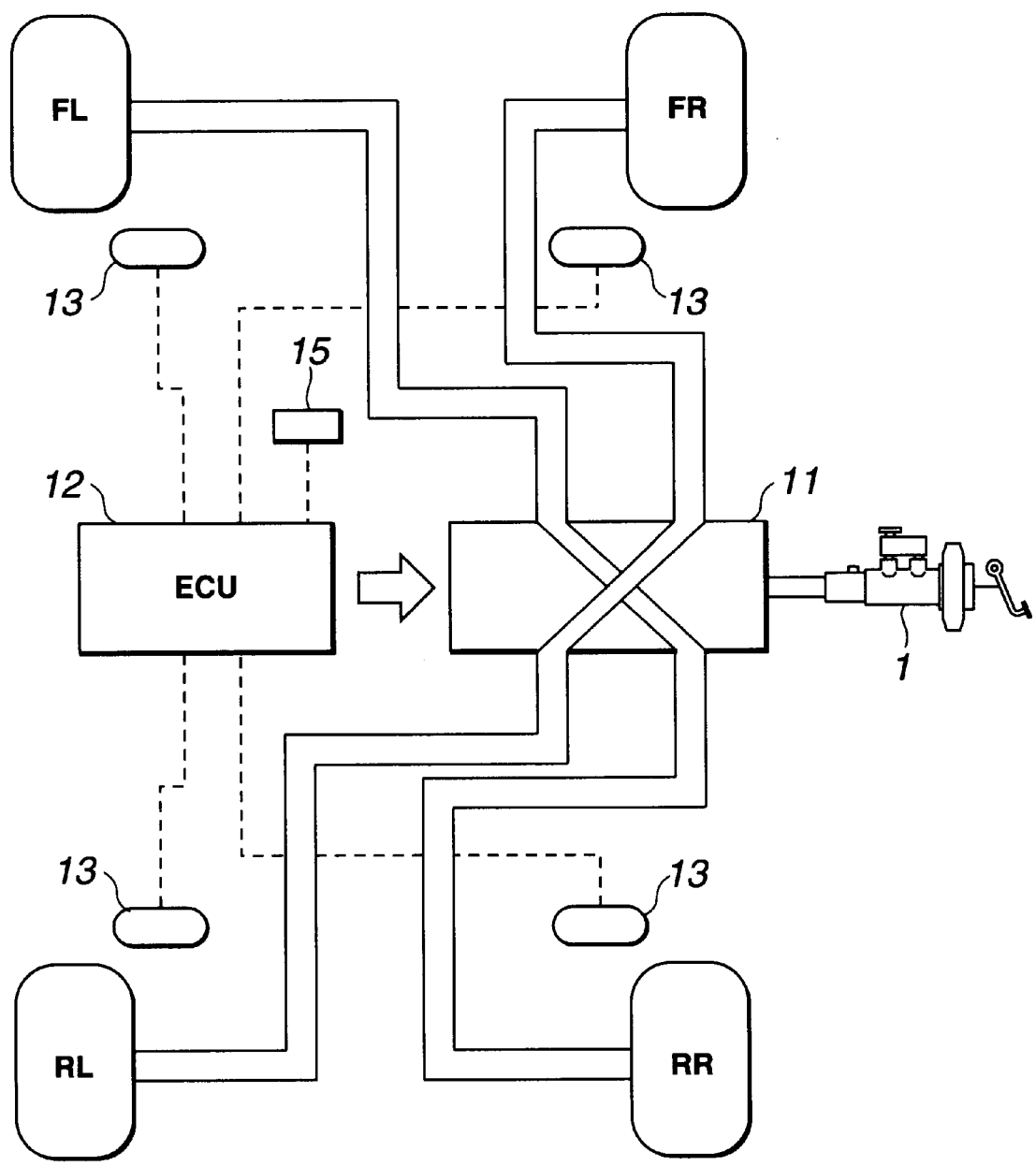
FIG. 2 shows an example of the brake control system of the embodiment which is adapted to an automotive vehicle with a four-channel ABS diagonal brake-circuit layout.

Referring now to the drawings, particularly to FIGS. 1 and 2, the automotive brake control system of the invention is exemplified in an automotive vehicle equipped with a four-channel ABS diagonal brake-circuit layout. In FIGS. 1 and 2, 1 denotes a master cylinder. The master cylinder 1 may be constructed by a typical tandem master cylinder with two pistons in tandem. For the purpose of illustrative simplicity, FIG. 1 merely shows the connection relationship of an ABS closed loop control circuit containing a hydraulic brake control unit (or a hydraulic modulator) 11 with respect to only one of the four wheel-brake cylinders 3. As the brake pedal is depressed, the piston in the master cylinder 1 applies pressure to brake fluid. The pressure forces the brake fluid through the inlet/outlet port of the master cylinder 1 into a hydraulic brake circuit 2. Then, the pressure is regulated by means of the hydraulic modulator 11 fluidly disposed in the hydraulic brake circuit 2, and the regulated pressure is supplied to the wheel-brake cylinder 3. The hydraulic modulator 11 includes at least a drain circuit 4, and a directional control valve 5. In order to properly regulate or control the brake-fluid pressure to the wheel-brake cylinder 3, the directional control valve 4 is designed to switch among three operating modes, namely a first operating mode or a pressure build-up mode where the upstream side (the master-cylinder side) of the brake circuit 2 is communicated with the downstream side (the wheel-brake cylinder side) of the brake circuit 2, a second operating mode or a pressure-reduction mode where the brake fluid in the wheel-brake cylinder 3 is relieved within toward the drain circuit 4, and a third operating mode or a pressure-hold mode where the brake circuit 2 is shut off and thus the brake-fluid pressure in the wheel-brake cylinder 3 is held constant. For the purpose of illustrative simplicity, although only one directional control valve 5 is shown in FIG. 1, actually, as can be appreciated from the simplified arrangement of the four-channel ABS system for diagonal brake-circuit layout shown in FIG. 2, the hydraulic modulator 11 has a plurality of directional control valves usually comprised of electromagnetic solenoid valves, so as to independently regulate the fluid pressure to each individual wheel cylinder. Also, the hydraulic modulator 11 has a pressure accumulator 6 disposed in each drain circuit 4, and a return pump 7, often called an "ABS pump". The pressure accumulator 6 is designed to temporarily store energy by holding the surplus brake fluid, which will occur anytime that there is a drop in system pressure (especially during the pressure-reduction mode). The return pump 7 is designed to carry or return the brake fluid flowing from the wheel-brake cylinders 3 via the individual accumulators 6 into the correct circuit of the master cylinder 1 (i.e., the upstream side of the directional control valve 5). With the previously arrangement of the ABS system shown in FIGS. 1 and 2, the brake-fluid pressure to each wheel-brake cylinder can be properly regulated or controlled. The operation (switching among valve positions) of the directional control valve 5 associated with each wheel-brake cylinder 3 and the operation (switching between inoperative and operative states) of the return pump 7 are electrically controlled by means of an electronic control unit (ECU) or an electronic control module (ECM) or a skid control unit 12. The electronic control unit 12 usually comprises a microcomputer. Although it is not clearly shown in FIG. 2, the electronic control unit 12 includes a central processing unit (CPU) that performs necessary arithmetic-calculations, processes informational data, compares signals from the sensors to preprogrammed threshold values, and makes necessary decisions of acceptance, memories (RAM, ROM), and an input/output interface. Actually, the ECU 12 performs various data processing actions shown in FIGS. 3 through 7 which will be fully described later. The input interface of the control unit 12 receives input informational data from various engine/vehicle sensors/switches, that is, four wheel speed sensors (13, 13, 13, 13), and a brake switch 15. The four wheel speed sensors 13 placed at the respective road wheels (FL, FR, RR, RL) are provided to continuously monitor or detect each individual wheel's rotational speed and relay this signal to the input interface of the electronic control unit 12. The brake switch 15 is designed to generate a switched-ON signal (or a high-voltage signal) when the brake pedal is depressed and thus the brakes are applied. Conversely, when the brake pedal is undepressed and thus the brakes are released, the input interface of the ECU 12 receives a switched-OFF signal (or no electrical signal) from the brake switch 15. The memories store preprogrammed or predetermined data such as various threshold values and temporarily stores the results of arithmetic-calculations and the necessary decisions made by the CPU. The output interface of the ECU 12 is configured to be electronically connected to each directional control valve 5 of the hydraulic modulator 11, to produce a control command signal to the directional control valve 5 associated with each individual wheel-brake cylinder 3 as well as the return pump 7, on the basis of the results of arithmetic-calculations and decisions performed by the CPU.

Hereunder described in detail is the skid control routine (shown in FIG. 3) executed by the brake control system of the embodiment and preprogrammed in the CPU of the electronic control unit 12.

In step S1, the more recent wheel speed indicative data signal (that is, the latest up-to-date information being received from the four wheel speed sensors 13), are read, and then a wheel speed Vw at each road wheel (a front-right wheel speed VwFR, a front-left wheel speed VwFL, a rear-right wheel speed VwRR, and a rear-left wheel speed VwRL) is arithmetically calculated. Then, an acceleration/ deceleration rate (simply an acceleration/deceleration ΔVw) at each road wheel (a front-right wheel acceleration/deceleration ΔVwFR, a front-left wheel acceleration/deceleration ΔVwFL, a rear-right wheel acceleration/deceleration ΔVwRR, and a rear-left wheel acceleration/deceleration ΔVwRL) is arithmetically calculated. In step S2, a pseudo vehicle speed Vi is arithmetically calculated or determined by a predetermined or pre-programmed arithmetic processing which will be fully described later by reference to the flow chart shown in FIG. 4. In step S3, a vehicle deceleration ΔVi is arithmetically calculated or determined by a pre-programmed arithmetic processing which will be fully described later by reference to the flow chart shown in FIG. 5. Then, in step S4, a pressure-reduction threshold value λ1 is arithmetically calculated from the following expression.

$$\lambda 1 = Vi \times K - x \; (unit: Km/h)$$

where K denotes a constant such as 0.95, and x denotes a correction value being variable depending on whether the road-surface condition corresponds to high-μroad or low-μroad (concretely, in the shown embodiment, the correction value x is set at 8 during vehicle driving on the high-μroad, and set at 4 during vehicle driving on the low-μroad).

In step S5, each of the wheel speeds (VwFR, VwFL, VwRR, VwRL) is compared to the pressure-reduction threshold value λ1, and a check is made to determine whether the respective wheel speed Vw is less than the pressure-reduction threshold value λ1. When the answer to step S5 is in the affirmative (YES), i.e., in case of Vw<λ1, the program proceeds to step S7. Conversely, when the answer to step S5 is in the negative (NO), i.e., in case of Vw≧λ1, the program proceeds to step S6. In step S6, each of the wheel acceleration/deceleration values (ΔVwFR, ΔVwFL, ΔVwRR, ΔVwRL) is compared to a predetermined pressure-hold threshold value λ2, and a check is made to determine whether the respective wheel acceleration/deceleration ΔVw is less than the pressure-hold threshold value λ2. When the answer to step S6 is affirmative (YES), i.e., in case of ΔVw<λ2, step S9 occurs. Conversely, when the answer to step S6 is negative (NO), i.e., in case of ΔVw≧λ2, step S8 occurs. The acceleration/deceleration value ΔVw at each road wheel is defined as the time rate of change of each of the wheel speeds (VwFR, VwFL, VwRR, VwRL). Thus, when the inequality ΔVw<λ2 is satisfied in step S6, the CPU of the electronic control unit 12 determines or decides that the wheel speed Vw is almost equal to the pseudo vehicle speed Vi, and then the procedure flows to step S9, so as to execute the pressure-hold mode (or the pressure-hold control) with the directional control valve (the solenoid valve) 5 held at its pressure-holding valve position. In contrast, when the inequality ΔVw≧λ2 is satisfied in step S6, the CPU of the ECU 12 decides that the wheel speed Vw is returning to the pseudo vehicle speed Vi, and thus the procedure flows to step S8, so as to execute the pressure build-up mode (or the pressure build-up control) with the control valve 5 held at its pressure-increasing valve position. On the other hand, when the inequality Vw<λ1 is satisfied in step S5, the CPU of the ECU 12 decides that a skid (a wheel lock-up condition) starts to develop, and thus the procedure flows to step S7, so as to execute the pressure-reduction mode (or the pressure-reduction control) with the control valve 5 held at its pressure-decreasing valve position. Details of the pressure-reduction control and the pressure build-up control will be fully described later in reference to the flow charts shown in FIGS. 6 and 7.

Subsequently to step S7, that is, just after shifting to the pressure-reduction mode, step S10 occurs. In step S10, a pressure build-up counter and a pressure build-up flag are both cleared to "0". On the other hand, just after shifting to the pressure build-up mode through step S8, step S11 occurs. In step S11, a pressure-reduction counter and a pressure-reduction flag are cleared to "0". Thereafter, the program proceeds to step S12. In step S12, a test is made to determine whether a predetermined time period Too such as 10 msec has been elapsed from the beginning of the current skid-control routine. When the answer to step S12 is affirmative (YES), the program returns to step Si, so as to execute the next cycle following the current cycle. In other words, the arithmetic processing or the skid control routine shown in FIG. 3 is executed as time-triggered routines to be triggered every predetermined intervals such as 10 msec.

Figure 3:
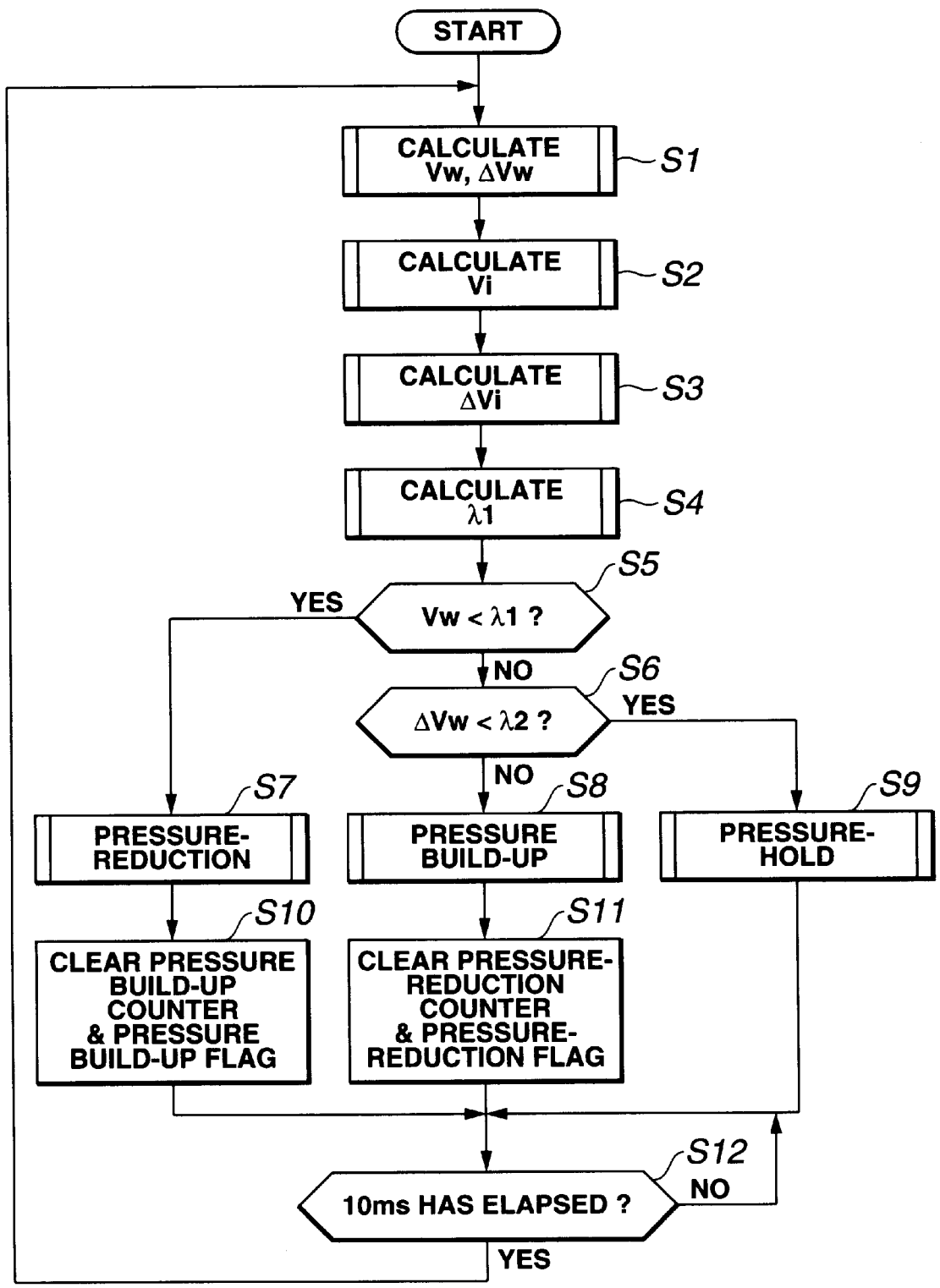
FIG. 3 is a flow chart illustrating a main routine of skid control (ABS control) executed by the brake control system of the embodiment.
Figure 4:
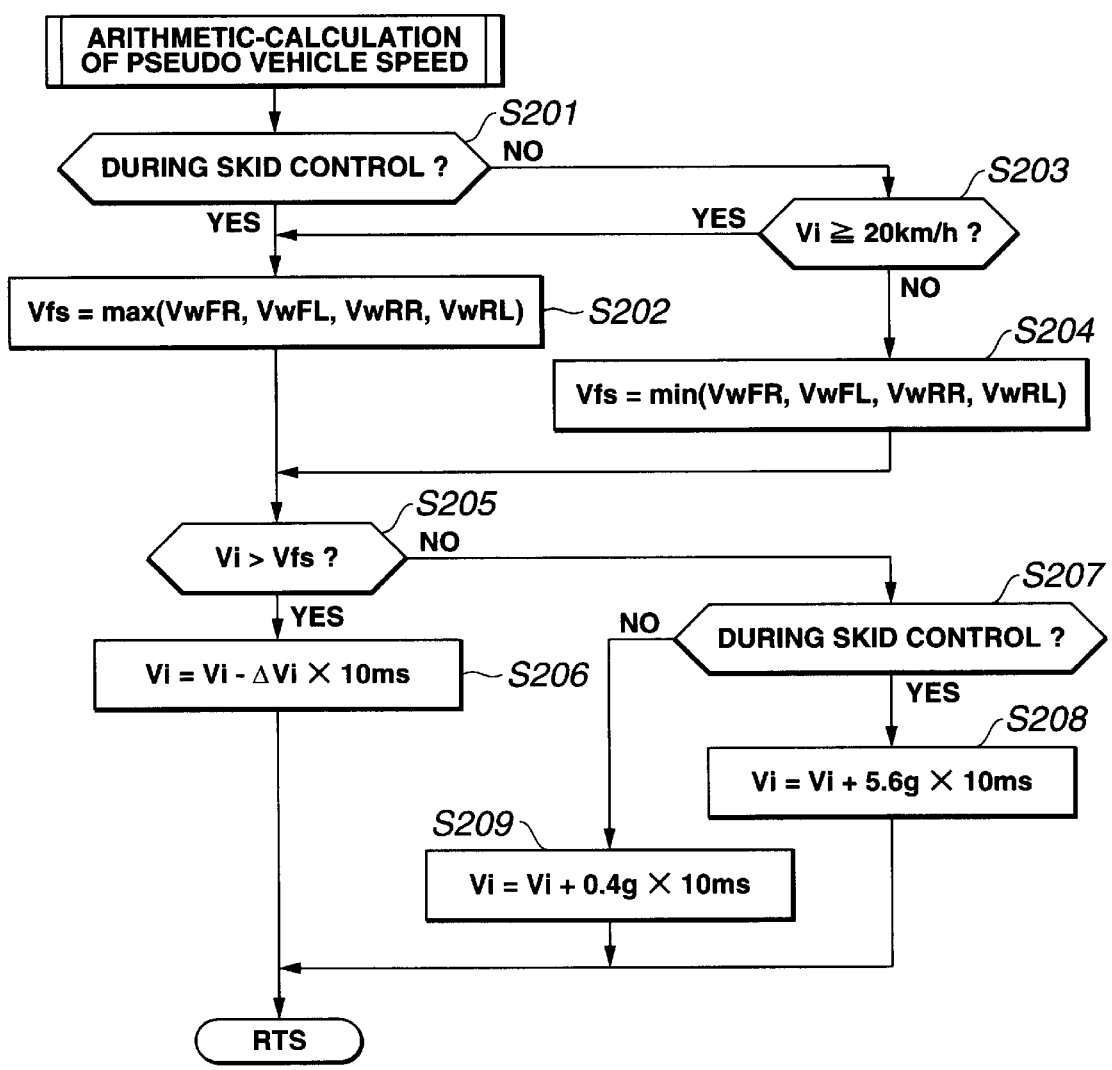
FIG. 4 is a flow chart illustrating an arithmetic-calculation routine for the pseudo vehicle speed Vi, executed within the system of the embodiment.

Referring now to FIG. 4, there is shown the pseudo vehicle speed (Vi) arithmetic-calculation sub-routine, related to step S2 of FIG. 3.

In step S201, a check is made to determine whether the ABS system is conditioned in its operative state (that is, the skid control mode is executed). When the answer to step S201 is affirmative (YES), that is, during ABS operation (during skid control), step S202 occurs. In step S202, the highest one of the four wheel speed data VwFR, VwFL, VwRR and VwRL is selected as the selected value Vfs by way of the select-HIGH process max(VwFR, VwFL, VwRR, VwRL). When the answer to step S201 is negative (NO), step S203 occurs. In step S203, a test is made to determine whether the vehicle is running in the previously-described resonant speed range or in the previously-described non-resonant speed range. Concretely, the latest up-to-date information data concerning the pseudo vehicle speed Vi (the more recent pseudo vehicle speed data Vi) is compared to a predetermined speed such as 20 km/h. When the answer to step S203 is affirmative (Vi≧20 km/h), the ECU 12 decides that the vehicle is running in the non-resonant speed range, and thus the routine proceeds to step S202, so as to arithmetically calculate or determine the selected value Vfs by virtue of the select-HIGH process. Conversely, when the answer to step S203 is negative (Vi<20 km/h), the ECU 12 decides that the vehicle is running in the resonant speed range, and thus the routine proceeds to step S204. In step S204, the lowest wheel speed (or the second lowest wheel speed) of the four wheel speed data VwFR, VwFL, VwRR and VwRL is selected as the selected value Vfs byway of the select-LOW process min (VwFR, VwFL, VwRR, VwRL). Then, the routine flows from steps S202 or S204 to step S205. In step S205, a test is made to determine whether the pseudo vehicle speed Vi is greater than the selected value Vfs. The selected value Vfs functions as a reference value needed to determine a pseudo vehicle speed Vi at each cycle of the pseudo-vehicle-speed arithmetic-calculation routine of FIG. 4. When the answer to step S205 is affirmative (Vi>Vfs), the ECU 12 decides that the deceleration mode is required or the vehicle is decelerating, and thus the routine proceeds to step S206. In step S206, the previous value $Vi_{(n-1)}$ of the calculated pseudo vehicle speed Vi is updated by the current value $Vi_{(n)}$ defined by the expression Vi=Vi−ΔVi×10 ms (exactly, $Vi_{(n)}$= $Vi_{(n-1)}$−ΔVi×10 ms). When the answer to step S205 is negative (Vi≦Vfs), the ECU 12 decides that the acceleration mode is required or the vehicle is accelerating, and thus the routine flows to step S207. In step S207, the same check as step S201 is made to determine whether or not the ABS system is in operation. When the answer to step S207 is affirmative (during skidcontrol), step S208 occurs. In step S208, the previous value $Vi_{(n-1)}$ of the calculated pseudo vehicle speed Vi is updated by the current value $Vi_{(n)}$ definedby the expression Vi=Vi+5.6 g×10 ms (exactly, $Vi_{(n)}=Vi_{(n-1)}+5.6$ g×10 ms). When the answer to step S207 is negative (that is, the ABS system is inoperative), step S209 occurs. In step S209, the previous value $Vi_{(n-1)}$ of the calculated pseudo vehicle speed Vi is updated by the current value $Vi_{(n)}$ defined by the expression Vi=Vi+0.4 g×10 ms (exactly, $Vi_{(n)}=Vi_{(n-1)}+0.4$ g×10 ms).

Figure 5:
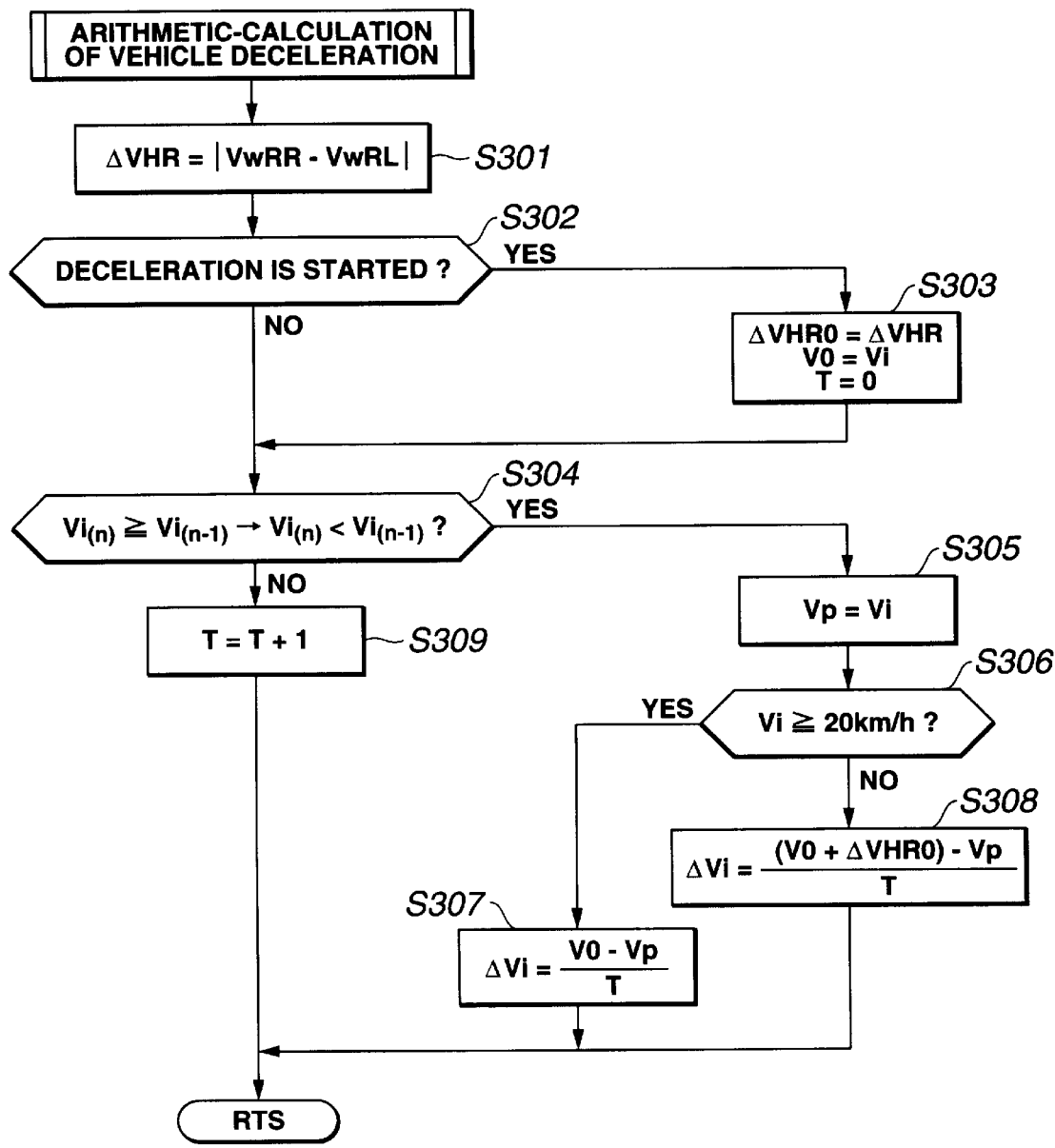
FIG. 5 is a flow chart illustrating an arithmetic-calculation routine for the vehicle deceleration ΔVi, executed within the system of the embodiment.

Referring now to FIG. 5, there is shown the vehicle-deceleration (ΔVi) arithmetic-calculation sub-routine, related to step S3 of FIG. 3.

In step S301, a wheel-speed difference ΔVHR between the rear-right wheel speed VwRR and the rear-left wheel speed VwRL is arithmetically calculated from the expression ΔVHR=|VwRR−VwRL|. In step S302, a check is made to determine whether the vehicle starts to decelerate. In the electronic brake control system of the embodiment, the decision made through step S302 is based on a signal from the brake switch 15. That is, the ECU 12 decides that the vehicle begins to decelerate, when the signal from the brake switch 15 changes from no electrical signal (OFF signal) to a high-voltage signal (ON signal). Alternatively, the timing of shifting to deceleration may be decided depending on whether all of the four wheel acceleration/deceleration data ΔVwFR, ΔVwFL, ΔVwRR, and ΔVwRL are below a pre-determined wheel deceleration rate threshold, such as −0.4 g. In such a case, when all of the four wheel acceleration/deceleration data ΔVwFR, ΔVwFL, ΔVwRR, and ΔVwRL are below the predetermined wheel deceleration rate threshold such as −0.4 g, the ECU decides that the vehicle starts to decelerate. When the answer to step S302 is affirmative (YES), the routine proceeds to step S303. In step S303, the more recent wheel speed difference data ΔVHR is set at the difference ΔVHR0 between a turning radius of the outer rear wheel and a turning radius of the inner rear wheel. The difference ΔVHR0 in wheel travel between the inner and outer wheels will be hereinafter referred to simply as a "wheel-travel difference". In the shown embodiment, the difference in wheel travel between the inner-rear and outer-rear road wheels is used as the wheel-travel difference ΔVHR0. In order to remarkably increase effects of the invention, it is more preferable to use the maximum difference in wheel travel of the vehicle with the brake control system of the embodiment, that is, a maximum wheel-travel difference between the outer wheel (usually, the outer-front wheel) turning on a maximum turning radius and the inner wheel (usually, the inner-rear wheel) turning on a minimum turning radius, as the wheel-travel difference ΔVHR0. As is generally known, the maximum wheel-travel difference can be determined as a fixed value depending on a sort of automotive vehicles (a wheel base, a tread (or track width), a size of the vehicular body, and the like). Therefore, various arithmetic calculations executed during skid control (e.g., pseudo-vehicle-speed (Vi) arithmetic calculation as well as vehicle deceleration (ΔVi) arithmetic calculation), and the ABS system itself can be simplified. Additionally, in step S303, the more recent pseudo vehicle speed Vi is set at the vehicle-deceleration starting-period vehicle speed V0, while the derivative time T is cleared to "0". After step S303, or when the answer to step S302 is negative (NO), step S304 occurs. In step S304, the ECU 12 compares the current value $Vi_{(n)}$ of the calculated pseudo vehicle speed Vi with the previous value $Vi_{(n-1)}$ calculated one cycle before (10 milliseconds before) by way of the pseudo-vehicle-speed arithmetic-calculation routine shown in FIG. 4, and thus analyses changes in the calculated pseudo vehicle speed Vi. Actually, a test is made to determine whether the pseudo vehicle speed Vi changes from a state defined by an inequality $Vi_{(n)} \geq V_{(n-1)}$ to a state defined by an inequality $Vi_{(n)} < Vi_{(n-1)}$. That is to say, by virtue of step S304, the ECU 12 decides whether the pseudo vehicle speed Vi varies from a pseudo-vehicle-speed increasing state ($Vi_{(n)} \geq Vi_{(n-1)}$) to a pseudo-vehicle-speed decreasing state ($Vi_{(n)} < Vi_{(n-1)}$). When the answer to step S304 is affirmative, that is, in the presence of shifting to the decreasing state of the pseudo vehicle speed Vi, the routine advances to step S305. In step S305, the current value $Vi_{(n)}$ of the pseudo vehicle speed Vi is set at the spin-up speed Vp. Thereafter, step S306 occurs. In step S306, the more recent pseudo vehicle speed data Vi is compared to the previously-discussed predetermined speed level such as 20 km/h (corresponding to a decision-criterion needed to determine whether the vehicle is running in the resonant speed range within which there is an increased tendency of occurrence of resonance between sprung and unsprung masses in a vehicle suspension vibrating system or in a brake vibrating system). When the answer to step S306 is affirmative (i.e., Vi≧20 km/h), that is, when the ECU determines that the vehicle is running in the non-resonant speed range (for example, in a high speed range), and thus the routine flows from step S306 to step S307. In step S307, the vehicle deceleration ΔVi is arithmetically calculated by the expression ΔVi=(V0−Vp)/T, where V0 denotes the vehicle-deceleration starting-period vehicle speed, Vp denotes the spin-up speed, and T denotes the derivative time. In contrast to the above, when the answer to step S306 is negative (i.e., Vi<20 km/h), that is, when the ECU determines that the vehicle is running in the resonant speed range (for example, in a low speed range), and thus the routine flows from step S306 to step S308. In step S308, the vehicle deceleration ΔVi is arithmetically calculated by the expression ΔVi=[(V0+ΔVHR0)−Vp]/T, where V0 denotes the vehicle-deceleration starting-period vehicle speed, ΔVHR0 denotes the difference between a turning radius of the outer rear wheel and a turning radius of the inner rear wheel, Vp denotes the spin-up speed, and T denotes the derivative time. Also, when the answer to step S304 is negative, that is, in the absence of shifting to the decreasing state of the pseudo vehicle speed Vi, the routine flows from step S304 to step S309. In step S309, the derivative time T is incremented by "1". As can be appreciated from the flow chart of FIG. 5, in the brake control system of the embodiment, during the vehicle running in the predetermined resonant speed range (corresponding to the low speed range), the current wheel-speed difference indicative data ΔVHR is set at the difference ΔVHR0 between a turning radius of the outer rear wheel and a turning radius of the inner rear wheel, at the beginning of deceleration. Additionally, the select-LOW wheel speed (the lowest wheel speed or the second lowest wheel speed of the four wheel speed data) is used as the selected value Vfs through the select-LOW process min (VwFR, VwFL, VwRR, VwRL) (see the flow from step S203 to step S204). Note that, in arithmetically calculating the vehicle deceleration ΔVi, the vehicle-deceleration starting-period vehicle speed is compensated for by adding the wheel-travel difference ΔVHR0 to the vehicle-deceleration starting-period vehicle speed V0 based on the select-LOW wheel speed (see the flow from step S306 to step S308). In this manner, by the use of the corrected value (V0+ΔVHR0), the vehicle-deceleration starting-period vehicle speed is raised or increased up to almost the same level as the pseudo vehicle speed Vi based on the select-HIGH wheel speed.

Figure 6:
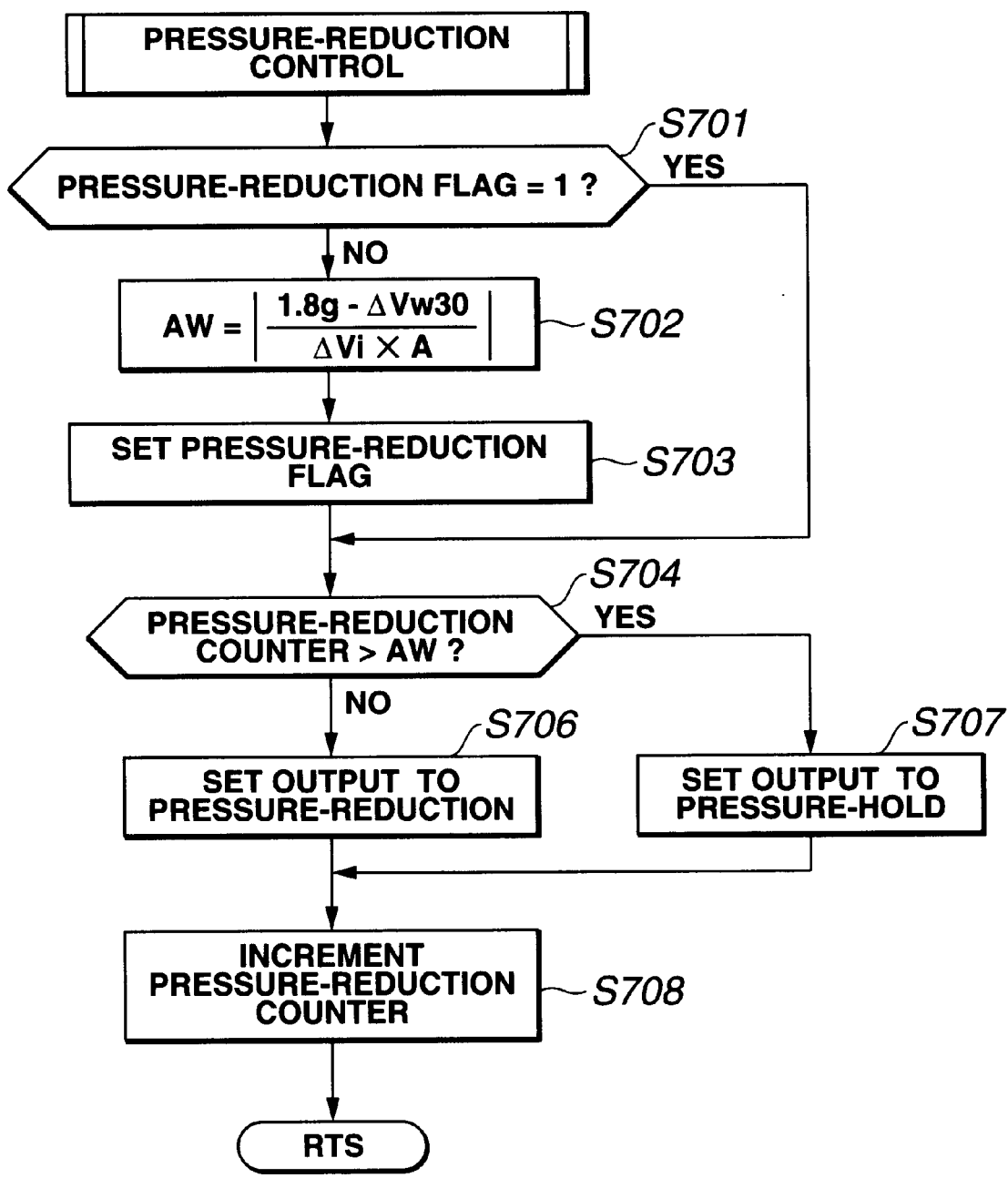
FIG. 6 is a flow chart illustrating a pressure-reduction control routine performed by the system of the embodiment.

Referring now to FIG. 6, there is shown the pressure-reduction control routine related to step S7 of FIG. 3.

In step S701, a test is made to determine whether the pressure-reduction flag is set or reset. When the answer to step S701 is negative (NO), that is, when the pressure-reduction flag is reset to "0", step S702 occurs. In step S702, the degree or amount AW of pressure-reduction, which will be hereinafter referred to as a "pressure-reduction amount", is calculated or computed from the expression AW=|(1.8 g−ΔVw30)/(ΔVi×A)| where A denotes a constant, and ΔVw30 denotes the wheel acceleration/deceleration arithmetically calculated 30 milli-seconds before (i.e., three cycles before). Step S703 follows step S702. In step S703, the pressure-reduction flag is set to "1". That is to say, the pressure-reduction flag is set at the initial pressure-reduction operating mode of the skid control, and reset at step S11 of the skid control routine shown in FIG. 3 just after the pressure build-up control mode is initiated at step S8 of FIG. 3. When the answer to step S701 is affirmative (YES), the routine jumps to step S704. In this manner, when the pressure-reduction flag is set, step S704 occurs. In step S704, a check is made to determine whether the counted value of the pressure-reduction counter exceeds the pressure-reduction amount AW. When the answer to step S704 is affirmative (YES), the routine proceeds to step S707. In step S707, the output from the output interface of the ECU 12 to the directional control valve 5 is set at a command signal corresponding to a "PRESSURE-HOLD" valve position, so as to execute the pressure-hold mode. When the answer to step S704 is negative (NO), that is, when the counted value of the pressure-reduction counter is below the pressure-reduction amount, the routine flows from step S704 to step S706. In step S706, the output from the output interface of the ECU 12 to the directional control valve 5 is set at a command signal corresponding to a "PRESSURE-REDUCTION" valve position, so as to change the operating mode to the pressure-reduction mode. Thereafter, in step S708, the pressure-reduction counter is incremented. As previously discussed, the counted value of the pressure-reduction counter and the pressure-reduction flag are both cleared to "0" at step S11 of the skid control routine shown in FIG. 3.

Figure 7:
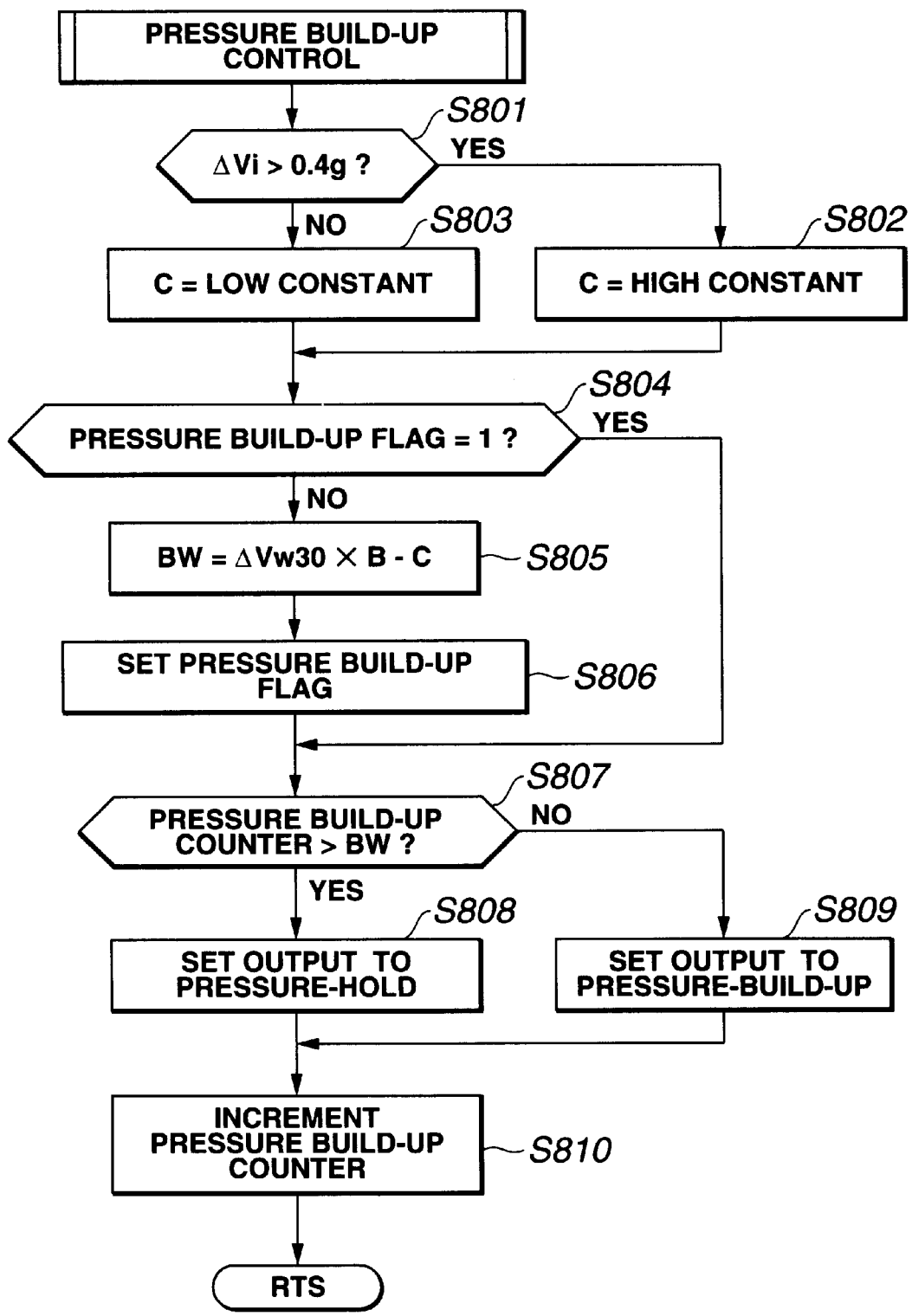
FIG. 7 is a flow chart illustrating a pressure build-up control routine performed by the system of the embodiment.
Figure 9A:
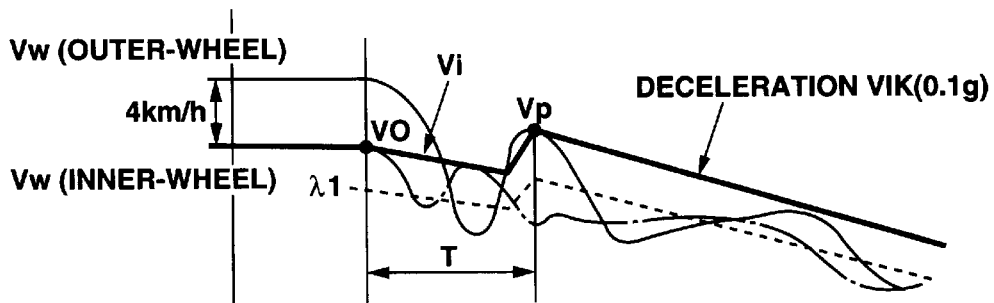
FIGS. 9A to 9D are timing charts illustrating simulation results pertaining to variations in the pseudo vehicle speed Vi, variations in the outer wheel speed $Vw_{(OUTER-WHEEL)}$, variations in the inner wheel speed $Vw_{(INNER-WHEEL)}$, variations in the outer-wheel side wheel-brake cylinder pressure $W/C_{(OUTER-WHEEL)}$, the inner-wheel side wheel-brake cylinder pressure $W/C_{(INNER-WHEEL)}$, and the actual vehicle deceleration, with no compensation for the pseudo vehicle speed Vi in the resonant speed range.
Figure 9B:
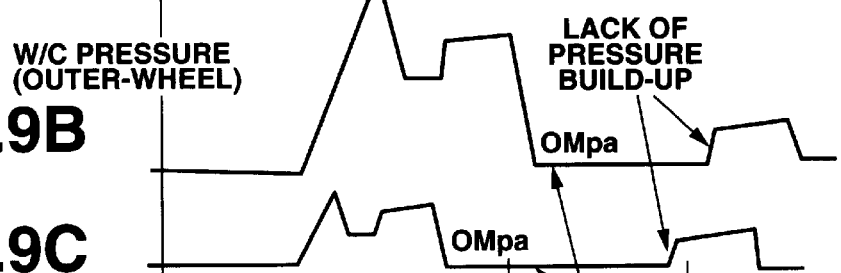
Figure 9C:
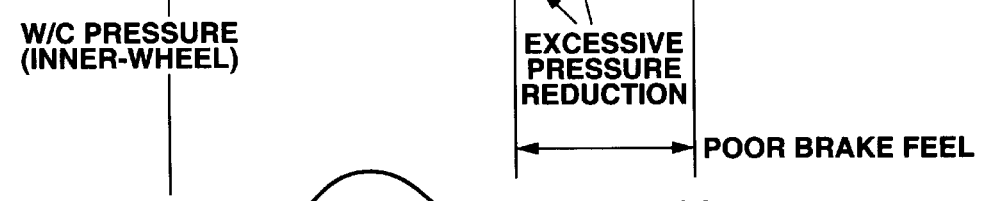
Figure 9D:

Referring now to FIG. 7, there is shown the pressure build-up control routine related to step S8 of FIG. 3.

In step S801, a test is made to determine whether the vehicle deceleration ΔVi is greater than a predetermined deceleration value 0.4 g. Usually, an acceleration value is defined as a positive value, whereas a deceleration value is defined as a negative value. In the shown embodiment, however, note that the vehicle deceleration value ΔVi is regarded as its absolute value |ΔVi|. When the answer to step S801 is affirmative (ΔVi>0.4 g), the ECU decides that comparatively great vehicle deceleration occurs, and thus the routine proceeds to step S802. In step S802, a predetermined constant (a comparatively high fixed value) suitable for the high-μroad is selected as a pressure build-up gain C. Conversely, when the answer to step S801 is negative (ΔVi≦0.4 g), the ECU decides that comparatively small vehicle deceleration occurs, and thus the routine proceeds to step S803. In step S803, a predetermined constant (a comparatively low fixed value) suitable for the low-μroad is selected as the pressure build-up gain C. After the pressure build-up gain C has been properly selected, step 804 occurs. In step S804, a test is made to determine whether the pressure build-up flag is set or reset. When the answer to step S804 is negative (NO), that is, when the pressure build-up flag is reset to "0", step S805 occurs. In step S805, the degree or amount BW of pressure build-up, which will be hereinafter referred to as a "pressure build-up amount", is calculated or computed from the expression BW=ΔVw30× B−C, where B denotes a constant, C denotes the pressure build-up gain selected depending on the road surface condition (high-μroad or low-μroad), and ΔVw30 denotes the wheel acceleration/deceleration arithmetically calculated 30 milli-seconds before (i.e., Three cycles before). Step S806 follows step S805. In step S806, the pressure build-up flag is set to "1". The pressure build-up flag is set at the initial pressure build-up operating mode of the skid control, and reset at step S10 of the skid control routine shown in FIG. 3 just after the pressure build-up control mode is initiated at step S7 of FIG. 3. When the answer to step S804 is affirmative (YES), the routine jumps to step S807. In this manner, when the pressure build-up flag is set, step S807 occurs. In step S807, a check is made to determine whether the counted value of the pressure build-up counter exceeds the pressure build-up amount BW. When the answer to step S807 is affirmative (YES), the routine proceeds to step S808. In step S808, the output from the output interface of the ECU 12 to the directional control valve 5 is set at a command signal corresponding to a "PRESSURE-HOLD" valve position, so as to execute the pressure-hold mode. When the answer to step S807 is negative (NO), that is, when the counted value of the pressure build-up counter is below the pressure build-up amount BW, the routine flows from step S807 to step S809. In step S809, the output from the output interface of the ECU 12 to the directional control valve 5 is set at a command signal corresponding to a "PRESSURE BUILD-UP" valve position, so as to change the operating mode to the pressure build-up mode. Thereafter, in step S810, the pressure build-up counter is incremented. As previously discussed, the counted value of the pressure build-up counter and the pressure build-up flag are both cleared to "0" at step S10 of the skid control routine shown in FIG. 3.

The operation of the brake control system of the embodiment is hereunder described in detail in reference to the timing charts shown in FIGS. 8A to 8D. The timing charts shown in FIGS. 8A to 8D are simulation results obtained on the assumption that the brakes are applied when the vehicle is turning on a predetermined turning radius (about 10.0 m) at comparatively low speeds such as speeds less than 20 km/h, and the rear-right (RR) and rear-left (RL) roadwheels are non-drivenwheels, whereas the front-right (FR) and front-left (FL) road wheels are driven wheels. In FIG. 8A, the thick solid polygonal line indicates variations in the pseudo vehicle speed Vi, the fine solid line indicates variations in the outer wheel speed $Vw_{(OUTER-WHEEL)}$, and the one-dotted line indicates the inner wheel speed $Vw_{(INNER-WHEEL)}$, and the polygonal broken line indicates the pressure-reduction threshold value λ1. During such a vehicle turn, there is a wheel speed difference ΔVHR between the wheel speed of the outer rear wheel turning on a relatively large radius and the wheel speed of the inner rear wheel turning on a relatively small radius. The wheel speed difference ΔVHR is set at the wheel-travel difference ΔVHR0. At the beginning of the braking action, the skid control is not yet executed, and thus in arithmetically calculating the pseudo vehicle speed Vi (see FIG. 4), the routine flows from step S201 through step S203 to step S204. As a result of this, by virtue of the select-LOW process min(VwFR, VwFL, VwRR, VwRL), the selected value Vfs is set at the select-LOW wheel speed. That is, the pseudo vehicle speed Vi is arithmetically calculated on the basis of the selected value Vfs set at the select-LOW wheel speed, according to the pseudo-vehicle-speed arithmetic-calculation routine of FIG. 4. In FIG. 8A, the brakes are applied from the time t0, and thus there is no occurrence of the vehicle deceleration ΔVi before the time t0. Until the time t0, the pseudo vehicle speed Vi is identical to the inner wheel speed Vw$_{(INNER-WHEEL)}$ by way of the select-LOW process. Under these conditions, the moment the brakes are applied at the time t0, the vehicle is still coasting, turning on the predetermined turning radius. Continuously, the wheel speed difference ΔVHR occurs. As a matter of course, the wheel speed difference ΔVHR is still dependent on the turning radius of the vehicle. After the brakes are applied at the time to, suppose the ABS system comes into operation. As soon as the multi-channel skid control (the four-channel skid control in the ABS system of the embodiment) is started, the wheel speeds of the respective road wheels are controlled independently of each other, so as to prevent a wheel lock-up condition of each road wheel. During the skid control, the wheel speed difference ΔVHR is not dependent upon the turning radius of the vehicle. Owing to the braking action, the wheel speeds Vw of the respective road wheels also reduce. As the wheel speed Vw of each wheel reduces, the pseudo vehicle speed Vi also falls. When the skid control is triggered due to the occurrence of the wheel lock-up condition, the pseudo-vehicle-speed arithmetic-calculation routine of FIG. 4, flows from step S201 to step S202, and therefore, the selected value Vfs is switched from the select-LOW wheel speed to the select-HIGH wheel speed. The wheel speed begins to rise again due to execution of the pressure-reduction mode of the skid control. Owing to both the rise in wheel speed and the switching operation of the selected value Vfs from the select-LOW wheel speed to the select-HIGH wheel speed, the pseudo vehicle speed Vi begins to rise again. Thereafter, owing to the pressure build-up mode of the skid control, the pseudo vehicle speed Vi as well as the wheel speed Vw changes from the increasing state to the decreasing state. In this manner, when the pseudo vehicle speed Vi drops again, the spin-up speed Vp is determined or set or detect according to the flow from step S304 to step S305 (see FIG. 5). Then, the program flows from step S306 to step S308, because of during the vehicle turning at speeds less than 20 km/h. As described previously, through step S308, the corrected vehicle deceleration ΔVi can be produced by increasingly correcting or compensating for the vehicle-deceleration starting-period vehicle speed by adding the wheel-travel difference ΔVHR0 (the wheel speed difference ΔVHR) to the vehicle-deceleration starting-period vehicle speed V0 based on the select-LOW wheel speed, and by dividing the increasingly-corrected vehicle-deceleration starting-period vehicle speed by the derivative time T from the time t0 (the vehicle-deceleration starting time point) to the time when the spin-up speed Vp is detected. In more detail, in the system of the embodiment, the vehicle speed estimated at the time when the vehicle starts to decelerate, is derived as the corrected vehicle-deceleration starting-period vehicle speed, which is obtained by adding the wheel-travel difference ΔVHR0 (the wheel speed difference ΔVHR) to the vehicle-deceleration starting-period vehicle speed V0 (the inner wheel speed Vw$_{(INNER-WHEEL)}$) based on the select-LOW wheel speed. Although the uncorrected vehicle-deceleration starting-period vehicle speed V0 corresponds to the inner wheel speed Vw$_{(INNER-WHEEL)}$, the corrected vehicle-deceleration starting-period vehicle speed (V0+ΔVHR0) corresponds to the outer wheel speed Vw$_{(OUTER-WHEEL)}$. On the other hand, the spin-up speed Vp, which is based on the select-HIGH wheel speed, corresponds to the outer wheel speed Vw$_{(OUTER-WEEL)}$. As a consequence, the vehicle deceleration ΔVi can be arithmetically calculated as the time rate of change of the wheel speed Vw$_{(OUTER-WHEEL)}$ at the same outer wheel. Therefore, when the pseudo-vehicle-speed arithmetic-calculation routine of FIG. 4 flows from step S205 to step S206 during the braking action that the condition defined by the inequality Vi>Vfs is satisfied, the updated pseudo vehicle speed Vi$_{(n)}$ can be accurately calculated based on the corrected (or increasingly-compensated) vehicle deceleration ΔVi(={(V0+ΔVHR0)−Vp}/T). Therefore, even during braking on turns, the pseudo vehicle speed Vi and the pressure-reduction threshold value λ1 can be accurately estimated or calculated by the use of the accurately corrected vehicle deceleration ΔVi.

As will be appreciated from the above, in order to prevent undesirable overestimation of the pseudo vehicle speed Vi occurring owing to resonance between sprung and unsprung masses in a vehicle suspension vibrating system and/or in a braking vibrating system, the brake control system of the embodiment, is constructed so that the selected value Vfs, used as a reference value for arithmetic calculation of the pseudo-vehicle-speed Vi, is set at the select-HIGH wheel speed max(VwFR, VwFL, VwRR, VwRL) during the skid control or during vehicle driving in a predetermined non-resonant speed range (at speeds above 20 km/h), and set at the select-LOW wheel speed min(VwFR, VwFL, VwRR, VwRL) during non-skid-control where the ABS system is inoperative, and during vehicle driving in a predetermined resonant speed range (at speeds less than 20 km/h). In addition to the above, in arithmetically calculating the selected value Vfs by way of the select-LOW process, the wheel-travel difference ΔVHR0 (corresponding to the wheel speed difference ΔVHR between inner and outer wheel speeds at the beginning of braking action) is detected or arithmetically calculated. Also, in arithmetically calculating the vehicle deceleration ΔVi, the vehicle deceleration is effectively corrected and accurately calculated on the basis of both the corrected vehicle-deceleration starting-period vehicle speed obtained by addition of the wheel-travel difference ΔVHR0 (the wheel speed difference ΔVHR) to the vehicle-deceleration starting-period vehicle speed V0 based on the selected value Vfs (obtained by the select-LOW process at the beginning of the braking action), and the spin-up speed Vp based on the selected value Vfs (obtained by the select-HIGH process during the skid control executed after the braking action). Accordingly, there is less possibility that the vehicle deceleration ΔVi is estimated as a value less than the actual vehicle deceleration value. This enhances the accuracy of arithmetic-calculation of the pressure-reduction threshold value λ1 as well as the pseudo vehicle speed Vi, thus avoiding excessive pressure-reduction and undesirable pressure-reduction timing (poor brake feel) during the skid control on turns. As discussed above, in the shown embodiment, the wheel speed difference ΔVHR calculated at the beginning of braking action is used as the correction value for the pseudo vehicle speed Vi. Additionally, in the system of the embodiment, the correction value is calculated as the difference in wheel speeds of non-driven left and right wheels (the rear-right and rear-left road wheels). Thus, the correction value can be optimized and the accuracy of arithmetic-calculation for the pseudo vehicle speed Vi can be highly enhanced. Alternatively, if a maximum wheel-travel difference (a fixed value) between the outer wheel turning on a maximum turning radius and the inner wheel turning on a minimum turning radius, is used as the wheel-travel difference ΔVHR0, the effect of compensation for the pseudo vehicle speed Vi as well as the vehicle deceleration ΔVi is very remarkable. Furthermore, it is possible to simplify by the use of the maximum wheel-travel difference inherent in each automotive vehicle as the wheel-travel difference ΔVHR0, simplifies various arithmetic calculations executed during skid control (e.g., pseudo-vehicle-speed (Vi) arithmetic calculation as well as vehicle deceleration (ΔVi) arithmetic calculation), and the skid control itself.

The entire contents of Japanese Patent Application No. P10-357713 (filed Dec. 16, 1998) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An automotive brake control system, comprising:

a hydraulic modulator capable of regulating wheel-brake cylinder pressures of each of road wheels of an automotive vehicle, independently of each other;

wheel-speed sensors detecting wheel speeds of each of the road wheels; and a skid control unit configured to be electronically connected to said hydraulic modulator, for operating said hydraulic modulator in response to input information signals from said wheel-speed sensors to prevent a wheel lock-up condition of each of the road wheels; said skid control unit comprising:

(a) a comparator determining whether the vehicle is running in a resonant speed range in which there is an increased tendency of occurrence of resonance between sprung and unsprung masses in at least one of a vehicle suspension vibrating system and a brake vibrating system, or in a non-resonant speed range except the resonant speed range, (b) a vehicle deceleration arithmetic-calculation section arithmetically calculating a vehicle deceleration ΔVi on a basis of a first speed V0 corresponding to the pseudo vehicle speed calculated at a time when the vehicle starts to decelerate and a second speed Vp corresponding to the pseudo vehicle speed calculated at a time when the pseudo vehicle speed is changed from an increasing state to a decreasing state at each cycle of skid control, from a predetermined expression ΔVi=(V0−Vp)/T, where V0 denotes the first speed, Vp denotes the second speed, and T denotes a derivative time corresponding to a period of time from the time when the vehicle starts to decelerate to the time when the pseudo vehicle speed is changed from the increasing state to the decreasing state, (c) a pseudo-vehicle-speed arithmetic-calculation section selecting a highest wheel speed of the wheel speeds as a reference value when the vehicle is running in the non-resonant speed range or during skid control, and selecting a wheel speed except the highest wheel speed from the wheel speeds as the reference value when the vehicle is running in the resonant speed range, and arithmetically calculating the pseudo vehicle speed on the basis of the reference value and the vehicle deceleration ΔVi during deceleration of the vehicle, and (d) a compensation section compensating for the pseudo vehicle speed by adding a correction value ΔVHR0 to the first speed V0 when the vehicle is running in the resonant speed range.

2. The automotive brake control system as claimed in claim 1, wherein the correction value ΔVHR0 is set at a wheel-speed difference between left and right road wheels, detected by said wheel-speed sensors, when the vehicle starts to decelerate.

3. The automotive brake control system as claimed in claim 2, wherein the wheel-speed difference between the left and right road wheels corresponds to a wheel-speed difference between non-driven road wheels.

4. The automotive brake control system as claimed in claim 1, wherein the correction value ΔVHR0 is fixed to a maximum wheel-travel difference of the vehicle equipping the automotive brake control system.

5. The automotive brake control system as claimed in claim 1, wherein said pseudo-vehicle-speed arithmetic-calculation section includes a comparator which compares the pseudo vehicle speed to the reference value and generates a comparator signal indicating that the vehicle is decelerating when the pseudo vehicle speed is less than the reference value, and wherein, in presence of the comparator signal indicating that the vehicle is decelerating, said pseudo-vehicle-speed arithmetic-calculation section arithmetically calculates the pseudo vehicle speed from an expression $Vi_{(n)}=Vi_{(n-1)}-\Delta Vi \times T_{10}$, where $Vi_{(n)}$ denotes a current value of the pseudo vehicle speed, $Vi_{(n-1)}$ denotes a previous value of the pseudo vehicle speed calculated one cycle before, ΔVi denotes the vehicle deceleration, and $T_{10}$ denotes a predetermined time interval between two consecutive cycles of arithmetic calculation of the pseudo vehicle speed Vi.

6. The automotive brake control system as claimed in claim 5, wherein said vehicle deceleration arithmetic-calculation section arithmetically calculates the vehicle deceleration ΔVi by the predetermined expression ΔVi=(V0−Vp)/T when the vehicle is running in the non-resonant speed range, and by a predetermined expression ΔVi={(V0+ΔVHR0)−Vp}/T when the vehicle is running in the resonant speed range.

7. The automotive brake control system as claimed in claim 6, wherein the correction value ΔVHR0 is fixed to a maximum wheel-travel difference of the vehicle equipping the automotive brake control system.

8. The automotive brake control system as claimed in claim 6, wherein the correction value ΔVHR0 is set at a wheel-speed difference between left and right road wheels, detected by said wheel-speed sensors, when the vehicle starts to decelerate.

9. The automotive brake control system as claimed in claim 8, wherein the wheel-speed difference between the left and right road wheels corresponds to a wheel-speed difference between non-driven road wheels.

* * * * *